Figure 1:
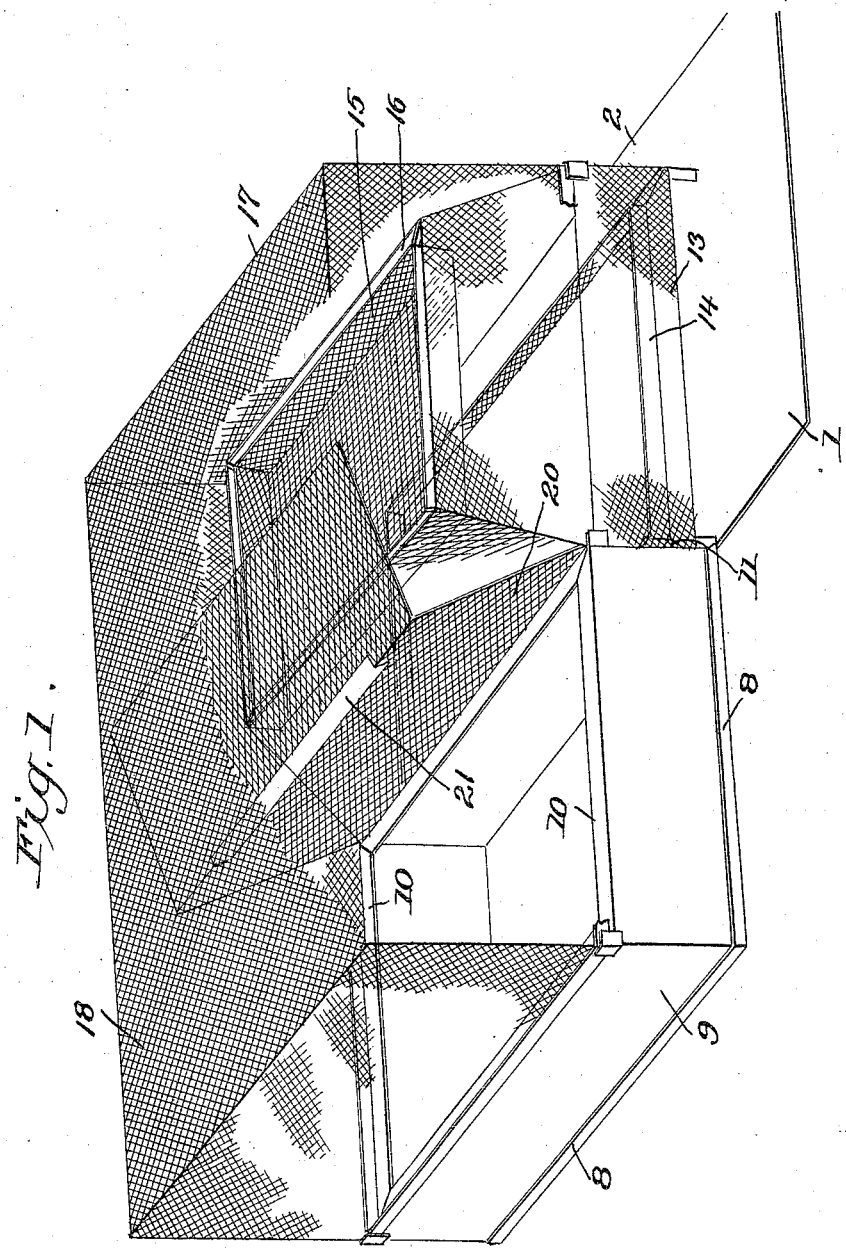

F. KARNES.
FLY TRAP.
APPLICATION FILED NOV. 23, 1910.

1,019,257.

Patented Mar. 5, 1912.
2 SHEETS—SHEET 1.

Witnesses

Inventor
Frank Karnes

By ____, Attorneys.

COLUMBIA PLANOGRAPH CO., WASHINGTON, D. C.

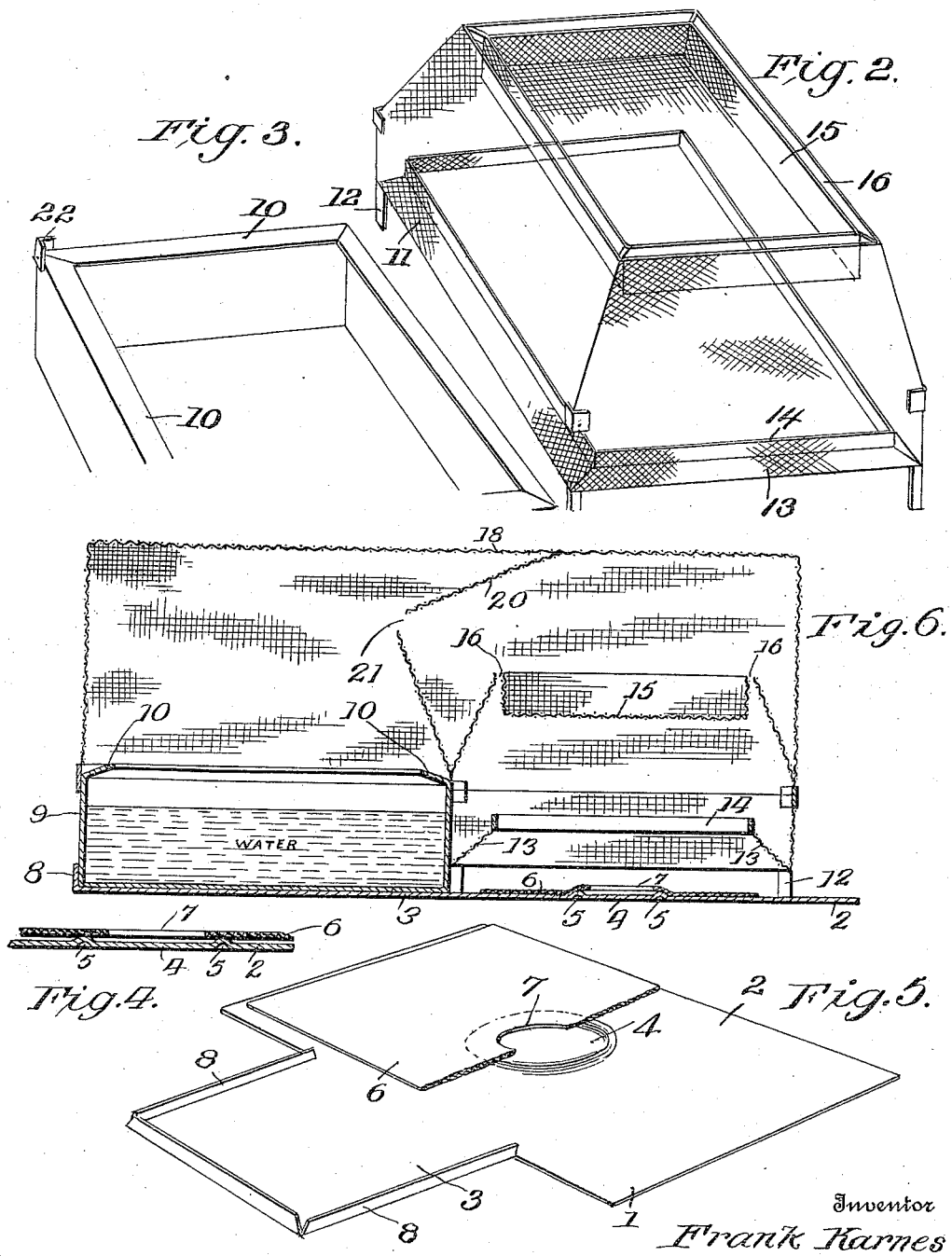

UNITED STATES PATENT OFFICE.

FRANK KARNES, OF GENESEO, ILLINOIS.

FLY-TRAP.

1,019,257.  Specification of Letters Patent.  Patented Mar. 5, 1912.

Application filed November 23, 1910. Serial No. 593,915.

*To all whom it may concern:*

Be it known that I, FRANK KARNES, citizen of the United States, residing at Geneseo, in the county of Henry and State of Illinois, have invented certain new and useful Improvements in Fly-Traps, of which the following is a specification.

This invention comprehends certain new and useful improvements in insect traps and is designed particularly for use in trapping and killing flies.

The invention has for its primary object an improved construction of fly trap, the parts of which are so arranged that the flies will be lured into the trap and, being attracted by the light which comes through the upper portions of the trap, will have a tendency to fly upward into the entrance compartment of the trap, whence they will be directed to other compartments without any practical means of escape, and be finally killed by plunging into a receptacle preferably containing soapy water, the entire trap being operated without the necessity of using poisonous or otherwise dangerous insecticides for the purpose of luring and killing the flies.

The invention also has for its object a trap of this character embodying improved means for catching the flies after they have been attracted to the bait, improved means for destroying the flies after they have been caught by the trap, and a trap which is composed of several parts easily separable one from another whereby the trap may be easily cleaned and maintained in a sanitary condition. And the invention also has for its object to generally improve this class of devices and render them more useful and commercially desirable.

With these and other objects in view as will more fully appear as the description proceeds, the invention consists in certain constructions, arrangements and combinations of the parts that I shall hereinafter fully describe and claim.

For a full understanding of the invention reference is to be had to the following description and accompanying drawing, in which:

Figure 1 is a perspective view of a fly trap constructed in accordance with my invention; Figs. 2 and 3 are similar views of different parts of the trap; Fig. 4 is a detail sectional view of a portion of the base plate and the cloth mat disposed thereon; and, Fig. 5 is a perspective view of the base plate, a portion of the mat being shown broken away.

Corresponding and like parts are referred to in the following description and indicated in all the views of the drawing by the same reference characters.

Referring to the drawing, the numeral 1 designates the floor or base of my improved fly trap, the same comprising two parts 2 and 3 preferably integrally connected and formed of a flat sheet of metal or other substance or material. In the present instance the part 2 of the base 1 is longer than the part 3 which latter is extended laterally from the part 2, as clearly illustrated in the drawing. The part 2 of the base is formed with a preferably centrally disposed bait cup 4 which is formed by stamping up the metal of which the base 1 is composed and which is preferably defined by an inwardly and outwardly sloping circular rim 5. The part 2 of the base is designed to be covered by a mat 6 of black cotton cloth, said mat being formed with an opening 7 which is preferably of somewhat less diameter than the bait cup 4 and is designed to register therewith, whereby the cloth defining the opening 7 will lap into the cup 4 when the mat is properly placed upon the base. By this arrangement the central portion of the bait cup is left open and the bait therein exposed and readily accessible to the insects. This is an important advantage and materially increases the efficiency and utility of the device, as insects that are attracted by the mat will feed on the same, while other insects will be attracted more readily by the mass of liquid or other bait in the cup.

The part 3 of the base is formed with upstanding marginal flanges 8 designed to hold in place a water box 9, said box detachably resting upon the base and being formed at its upper edge with inturned marginal flanges 10, intended to prevent the flies, after once falling into the soapy water or the like in the box 9, from escaping therefrom.

Mounted upon the main part 2 of the base 1 is an entrance compartment 11 which is supported in a relatively elevated position by means of corner legs 12, whereby the flies may enter underneath the compartment 11 and gain access to the bait in the cup 4. The base edge of the compartment 11 is provided with an inwardly and upwardly sloping runway 13 formed at its inner margin with a vertically and upwardly projecting rim 14, said runway and its rim being preferably constructed of wire screen or some similar reticulated material. Within this rim 14, the interior of the compartment 11 is opened, and the sides and ends are preferably sloped upwardly to the top, where there is secured a screen top or partition 15, the same being spaced from the sides and ends in one or more places, as desired, in order to provide passage ways 16 for the flies to pass from the compartment 11 to a second compartment which will now be described. In the present instance, the top partition 15 of the entrance compartment 11 is spaced from both sides and both ends of the latter. The second compartment of my improved trap, said compartment being designated 17, forms part of a preferably reticulated cage or inclosing casing 18 designed to be superimposed on the water box 9 and entrance compartment 11, and the said compartment 17 is separated from the end compartment 19 which is located directly over the box 9, by means of the transverse partition 20 which is preferably angular or V-shape in cross section, as best illustrated in Figs. 1 and 6. The partition 20 is formed with a transversely elongated passage or slot 21 which is preferably located at the apex between the two angularly disposed parts of the partition. In order to detachably hold the cage 18 upon the water box 9 and entrance compartment 11, both of the latter are formed at their corners with upstanding lugs 22 designed to engage the lower corners and opposite sides of the cage 18, as shown.

In the practical use of my improved fly trap, the bait, such as sugar, is placed within the cup 4, the mat 6 is applied, and preferably water is poured upon the sugar within the cup, the water being absorbed by the cotton cloth overlapping into the bait box. As soon as a fly has eaten its fill it will naturally have a tendency to fly upwardly into the entrance or first compartment 11, the black cloth being beneath and the light coming from above. The fly will then crawl into the second compartment 11, passing through the passages 16, and from thence will pass through the passage 21 into the end compartment 19 which contains the soapy water held by the box 9. In this water the fly will soon plunge and be killed. It will thus be seen that I have provided a very simple and efficient construction of fly trap the parts of which may be easily manufactured and readily assembled and disassembled for the purpose of cleaning so that the trap may be at all times maintained in a sanitary condition, there being no necessity for using poison to kill the flies, and the dangerous disadvantages incidental to the poisonous insecticides being thereby positively precluded.

Having described the invention, what is claimed is:

In a fly trap, a base having an upwardly directed annular ring forming a bait cup, and a mat of absorbent material bearing upon said base and provided with an opening less in diameter than the cup and projecting partly thereover and in contact with the bait in the cup and in position to absorb the same, and leaving the contents of the bait cup exposed.

In testimony whereof, I affix my signature in presence of two witnesses.

FRANK KARNES.

Witnesses:
ANABEL GRAY KARNES,
WM. C. WOOD.